(12) United States Patent
Snider et al.

(10) Patent No.: US 11,749,815 B2
(45) Date of Patent: *Sep. 5, 2023

(54) WET SEAL CAULK WITH ENHANCED CHEMICAL RESISTANCE

(71) Applicant: FuelCell Energy, Inc., Danbury, CT (US)

(72) Inventors: Matthew T. Snider, Danbury, CT (US); Chao-yi Yuh, New Milford, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/008,127

(22) Filed: Aug. 31, 2020

(65) Prior Publication Data

US 2020/0395622 A1 Dec. 17, 2020

Related U.S. Application Data

(63) Continuation of application No. 15/916,029, filed on Mar. 8, 2018, now Pat. No. 10,790,521.

(51) Int. Cl.
*H01M 8/00* (2016.01)
*H01M 8/0282* (2016.01)
(Continued)

(52) U.S. Cl.
CPC ......... *H01M 8/0282* (2013.01); *C04B 35/488* (2013.01); *C04B 35/50* (2013.01);
(Continued)

(58) Field of Classification Search
CPC .. H01M 8/0282; H01M 8/145; H01M 8/2485; H01M 8/0286; H01M 8/244; H01M 2008/147; H01M 8/0276; C04B 35/488; C04B 35/50; C04B 38/0054; C04B 2235/3229; C04B 2235/3244; Y02E 60/50
See application file for complete search history.

(56) References Cited

U.S. PATENT DOCUMENTS 4,761,348 A 8/1988 Kunz et al.
8,057,955 B2 11/2011 Kelley et al.
(Continued)

OTHER PUBLICATIONS

International Search Report and Written Opinion in PCT/IB2019/051825 dated May 27, 2019 (14 pages).
(Continued)

*Primary Examiner* — Nicholas P D'Aniello
(74) *Attorney, Agent, or Firm* — Foley & Lardner LLP

(57) ABSTRACT

A caulk composition includes: at least one powder component and at least one binder component. The powder component is a ball-milled powder component comprising ceria, zirconia, alumina, or a combination thereof. The powder component is a heat-treated powder component that has been heated to a temperature of at least 1500° C. The powder component is present in a concentration range of 65 wt % to 75 wt % of the caulk composition. The powder component has a particle size distribution of 95% less than 25 µm and 90% greater than 1 µm. The binder component is present in a concentration range of 25 wt % to 35 wt % of the caulk composition.

20 Claims, 7 Drawing Sheets

(51) Int. Cl.
| | |
|---|---|
| *C04B 35/488* | (2006.01) |
| *C04B 35/50* | (2006.01) |
| *H01M 8/14* | (2006.01) |
| *C04B 38/00* | (2006.01) |
| *H01M 8/2485* | (2016.01) |
| *H01M 8/0286* | (2016.01) |
| *H01M 8/244* | (2016.01) |

(52) U.S. Cl.
CPC ......... *C04B 38/0054* (2013.01); *H01M 8/145* (2013.01); *H01M 8/2485* (2013.01); *C04B 2235/3229* (2013.01); *C04B 2235/3244* (2013.01); *H01M 8/0286* (2013.01); *H01M 8/244* (2013.01); *H01M 2008/147* (2013.01)

(56) References Cited

U.S. PATENT DOCUMENTS

| | | | |
|---|---|---|---|
| 10,790,521 B2* | 9/2020 | Snider | C04B 35/50 |
| 2007/0231663 A1 | 10/2007 | Kelley et al. | |
| 2010/0068601 A1 | 3/2010 | Yuh et al. | |
| 2011/0200909 A1* | 8/2011 | Parihar | C04B 35/195 |
| | | | 429/469 |
| 2017/0062864 A1* | 3/2017 | Ohmori | H01M 8/2428 |

OTHER PUBLICATIONS

Sun et al., "Phase stability and thermal conductivity of ytterbia and yttria co-doped zirconia", Progress in Natural Science: Materials International 2013;23(4):pp. 440-445, Available online Jul. 27, 2013 (Year: 2013).
Zircar Zirconia Inc. "Zircon IA Bulk Fibers Type ZYBF" Product Data, Bulletin #C-F, Jan. 2004.

\* cited by examiner

WET SEAL CAULK WITH ENHANCED CHEMICAL RESISTANCE

CROSS-REFERENCE TO RELATED APPLICATIONS

This application is a continuation of U.S. patent application Ser. No. 15/916029, filed Mar. 8, 2018, the contents of which are incorporated herein by reference in their entirety.

BACKGROUND

The present application relates to fuel cell systems with at least one fuel cell stack and an external manifold and, in particular, to a seal for use in a fuel cell system having at least one externally manifolded fuel cell stack. More specifically, the present application relates to a caulk member between a manifold and fuel cell stack that minimizes gas leakage, maintains electrical isolation, and inhibits electrolyte migration.

A fuel cell is a device that converts chemical energy in the form of a fuel into electrical energy by way of an electrochemical reaction. In general, a fuel cell includes a negative electrode or anode and a positive electrode or cathode separated by an electrolyte that serves to conduct electrically charged ions between them. Fuel cells will continue producing electric power as long as fuel and oxidant are supplied to the anode and cathode, respectively. In order to produce a useful amount of power, individual fuel cells are typically arranged in stacked relationship in series with an electrically conductive separator plate between each cell.

A fuel cell stack may be an internally-manifolded stack or an externally-manifolded stack. In an internally-manifolded stack, gas passages for delivering fuel and oxidant are built into the fuel cell plates themselves. An internal manifold design requires no external manifold seal, but is expensive to manufacture.

In an external manifold configuration, individual fuel cells are left open on their ends and gas is delivered by way of manifolds sealed to the perimeter of the respective faces of the fuel cell stack. The manifolds provide sealed passages for delivering fuel and oxidant gases to the fuel cells and preventing those gases from leaking either to the environment or to the other manifolds. The manifolds must perform, for the duration of their life, these sealing functions under the required operating conditions of the fuel cell stack. The performance of an externally manifolded fuel cell stack depends in large part on an intervening seal established between the manifold edge and the stack face, since the seal may experience mechanical stresses due to manifold compression against the stack face and stack compaction during operation.

Conventional technologies have incorporated compressible ceramic felt gaskets between the manifold and stack face to better accommodate thermal and mechanical stresses and to improve the sealing function between the manifold edge and stack face (for reducing gas leakage). However, due to gasket material limitations and the non-uniform stack edge against which the gaskets are placed, currently available external manifold-stack seals are still not completely effective in eliminating gas leakage between the external manifolds and the stack face. Moreover, pores within the ceramic felt gaskets provide channels through which electrolytes are easily absorbed during fuel cell operation, thereby causing undesirable transport of the electrolyte from the positive end of the stack to the negative end. Such vertical electrolyte migration can deplete cells of electrolyte at the positive end of the stack and cause the fuel cells at the negative end of the stack to flood. Unwanted electrolyte migration may also occur due to movement of electrolyte from the stack to the manifold, which can short the stack. Electrolyte migration is a significant factor in reducing the efficiency and shortening the life of a fuel cell stack.

Other solutions for creating effective seals between the manifold and stack face have called for intervening caulk compositions comprising blends of ceria and zirconia. These compositions have been found to absorb unacceptable levels of electrolyte from the interior of the fuel cells (e.g., molten carbonate fuel cells, referred to as MCFCs). Higher electrolyte concentrations in the caulk may cause faster electrolyte movement along the stack corners, resulting in uneven electrolyte distribution and poorer fuel cell stack performance. Other compositions of caulk have often suffered from ineffective adhesion to the metallic components of the stack corner face, diminished mechanical stability, and cracking.

It would be advantageous to provide an improved caulk composition for sealing applications between a manifold and fuel cell stack in MCFCs that overcomes the foregoing challenges. These and other advantageous features will be apparent to those reviewing the present disclosure.

SUMMARY

An exemplary embodiment relates to a caulk composition comprising at least one powder component and at least one binder component, wherein the powder component has a particle size distribution in the range of 95% less than 25 μm and 90% greater than 1 μm.

In one implementation, the powder component is a ball-milled powder component comprising at least one of ceria, zirconia, alumina, or combinations thereof.

In one implementation, the powder component is zirconia.

In one implementation, the zirconia powder component is present in a concentration range of 65 wt % to 75 wt %.

In one implementation, the powder component is a heat-treated powder component.

In one implementation, the heat-treated powder component is heated at a temperature of at least 1500° C.

In one implementation, the powder component has a concentration in the range of 50 wt % to 80 wt %.

In one implementation, the binder component comprises at least one of ceria or zirconia.

In one implementation, the binder component is zirconia.

In one implementation, the zirconia binder component is present in a concentration range of 25 wt % to 35 wt %.

In one implementation, the binder component has a concentration in the range of 20 wt % to 35 wt %.

In one implementation, the caulk composition further comprises pores having a pore diameter in a range of about 1 nm to about 50 nm.

In one implementation, the caulk composition further comprises pores having a first pore diameter, wherein the pores have a cumulative pore area of at most about 1 m2/g.

In one implementation, the at least one powder component and the at least one binder component do not include ceria.

Another exemplary embodiment relates to a molten carbonate fuel cell (MCFC) comprising a fuel cell stack; a manifold; and a caulk between the fuel cell stack and the manifold, the caulk comprising at least one powder component and at least one binder component, wherein the powder component has a particle size distribution in the range of 95% less than 25 μm and 90% greater than 1 μm.

In one implementation, the fuel cell stack comprises a plurality of fuel cells, with each fuel cell including a cathode, an anode, an electrically conductive separator plate, corrugated current collectors, and an electrolyte matrix.

In one implementation, the caulk is positioned on a first portion of each fuel cell formed by the electrolyte matrix and on a second portion of each fuel cell formed by the separator plate.

In one implementation, the separator plate comprises a weld bead positioned between a top trough and a bottom trough of the separator plate and wherein the weld bead remains uncovered from the caulk to form a discontinuity.

In one implementation, the caulk is positioned discontinuously over the fuel cell stack.

In one implementation, the MCFC is configured to minimize electrolyte migration from a positive end of the fuel cell stack to a negative end of the fuel cell stack.

DETAILED DESCRIPTION

The present disclosure describes an improved caulk composition for sealing applications between a manifold and fuel cell stack in MCFCs that is in direct contact with electrolyte-containing cell components, such as electrolyte matrix and a manifold gasket. The caulk compositions described herein adhere well to the metal and ceramic components of the stack face; are mechanically stable at high-temperatures, even as the manifold shifts during operation of the fuel cell and causes the manifold gasket to slide over the top of the caulk composition; and resist migration of molten carbonate from the interior of the fuel cell to the manifold.

In one embodiment, a caulk composition is applied to portions of a fuel cell stack face. More particularly, a ceramic paste that adheres to the metal and ceramic fuel cell components to which it is applied forms an efficient manifold-stack seal without detrimentally affecting fuel cell performance or stack life. As noted above, an important function of the seal between the manifold and stack is to reduce or eliminate gas leakage. The caulk described herein conforms to the edges and contours of the fuel cell stack face side or edge areas to form a smooth surface to which the manifold gasket can be sealed.

Figure 1:
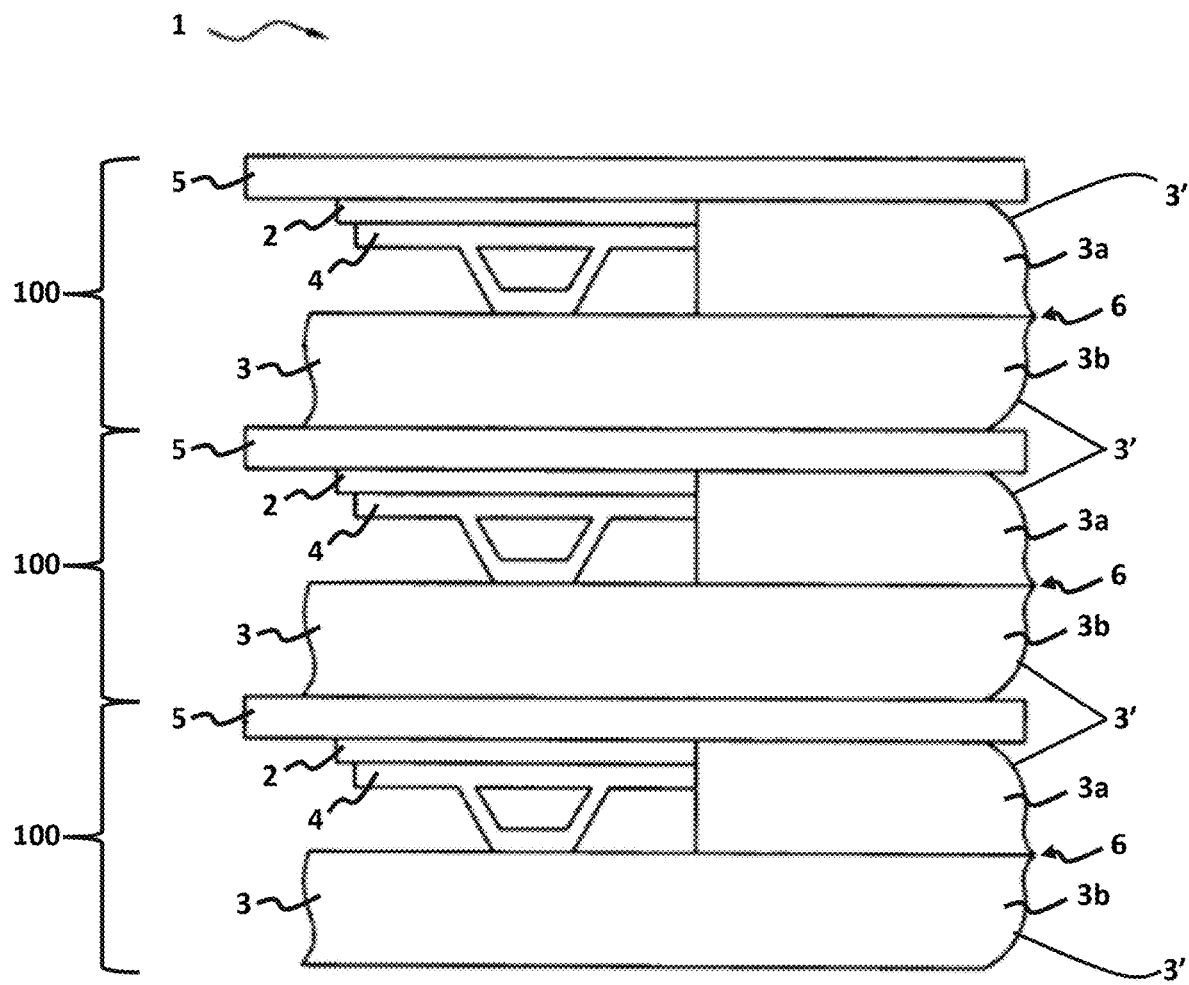
FIG. 1 is a schematic side view of a portion of a fuel cell stack, prior to application of the caulk seal.

FIG. 1, which is a schematic side view of a portion of a fuel cell stack 1 prior to application of the caulk seal, includes a plurality of fuel cells 100 with each fuel cell 100 comprising a cathode and anode (both together represented collectively by electrode 2), an electrically conductive separator plate 3, corrugated current collectors 4, and an electrolyte matrix 5. The fuel cells are stacked in series with a bipolar separator plate 3 between each cell. Three-dimensional S-shaped structures 3' of the bipolar separator plate 3 are formed by welding pieces that form a top trough 3a and a bottom trough 3b of the bipolar separator plate 3 to the edges of the center plate. When the edges are welded and the separator plate is folded and bent, the welded edge has a radius referred to as a weld bead 6.

Figure 2:
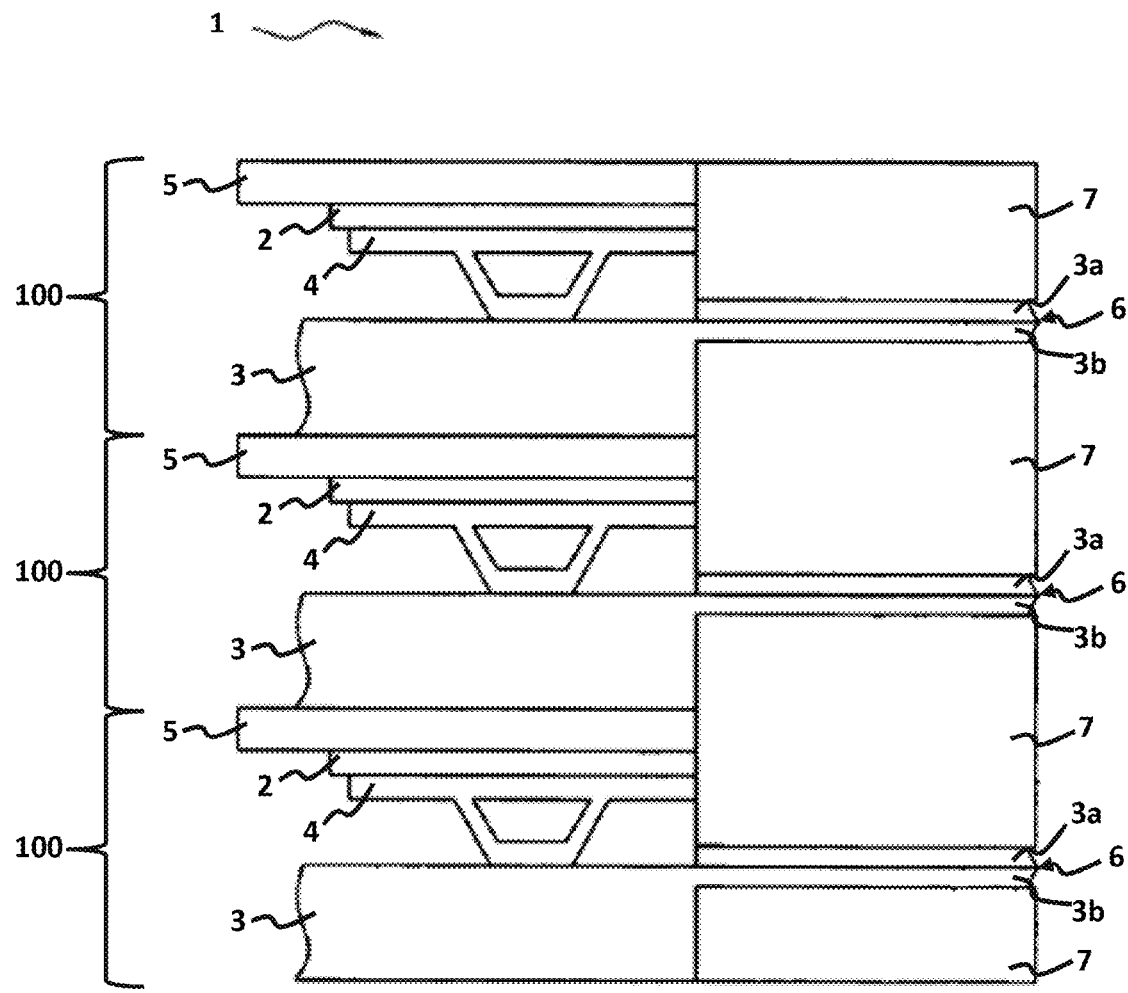
FIG. 2 is a schematic side view of the portion of the fuel cell stack shown in FIG. 1, after application of the caulk seal.

FIG. 2 is a schematic side view of the portion of a fuel cell stack face showing the smooth surface along the stack side or edge area created by caulk 7 of the illustrative embodiment. As shown in FIG. 2, the caulk 7 is disposed on portions of the stack face side or edge area formed by the ends of the electrolyte matrices 5 and the end areas of the bipolar separator plates 3. However, the caulk 7 is applied discontinuously, so that parts of the end areas of the bipolar separator plates 3 remain uncovered. In particular, the caulk 7 is not applied over the weld beads 6 formed at the end areas. As a result, a portion of the top trough 3a and a portion of the bottom trough 3b that meet at weld bead 6 and separate adjacent panels of smooth surfaces of caulk 7, remain uncovered to form a discontinuity. This discontinuity helps to prevent electrolyte migration from the positive (top) end to the negative (bottom) end of the stack, since any electrolyte absorbed by the caulk 7 cannot vertically migrate farther than the discontinuity separating the adjacent panels of smooth surfaces of caulk 7.

Figure 3:
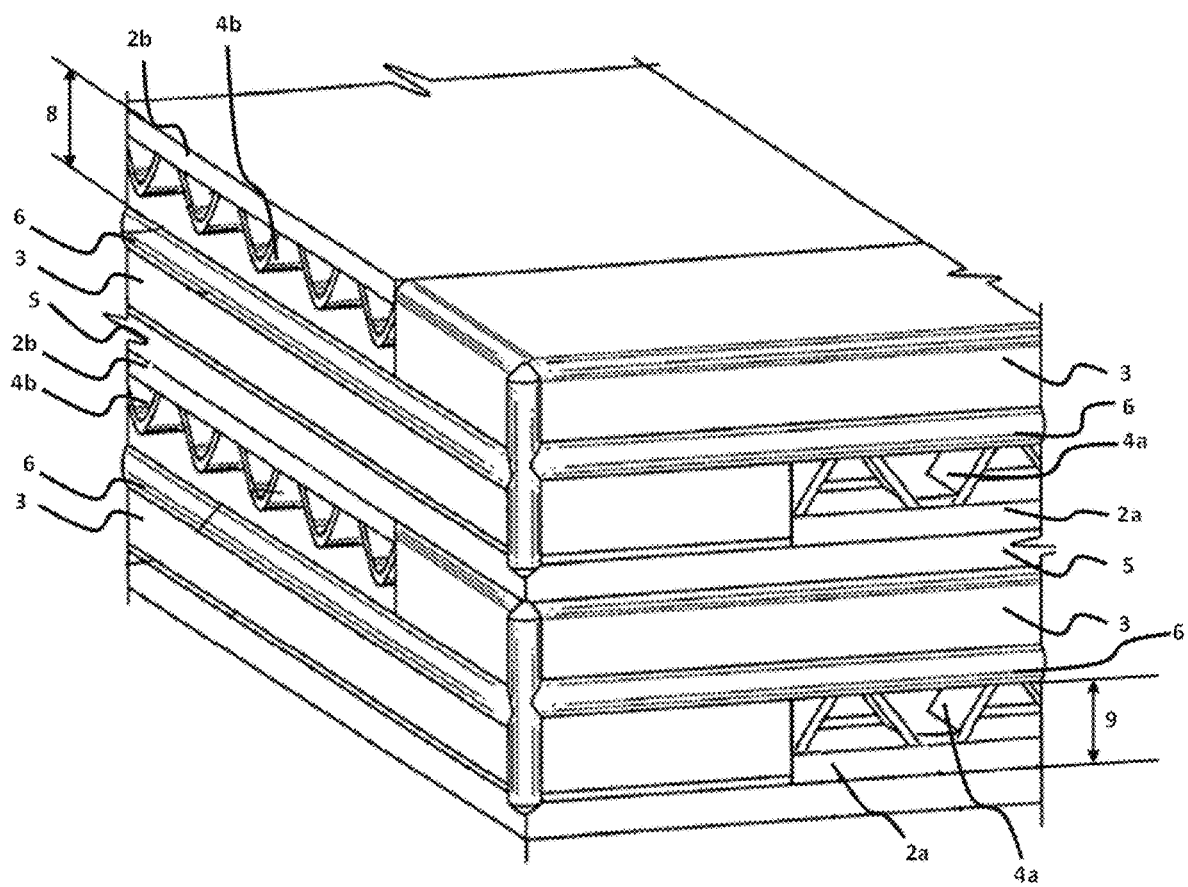
FIG. 3 is a schematic perspective view of a portion of a fuel cell stack, prior to application of the caulk seal.
Figure 4:
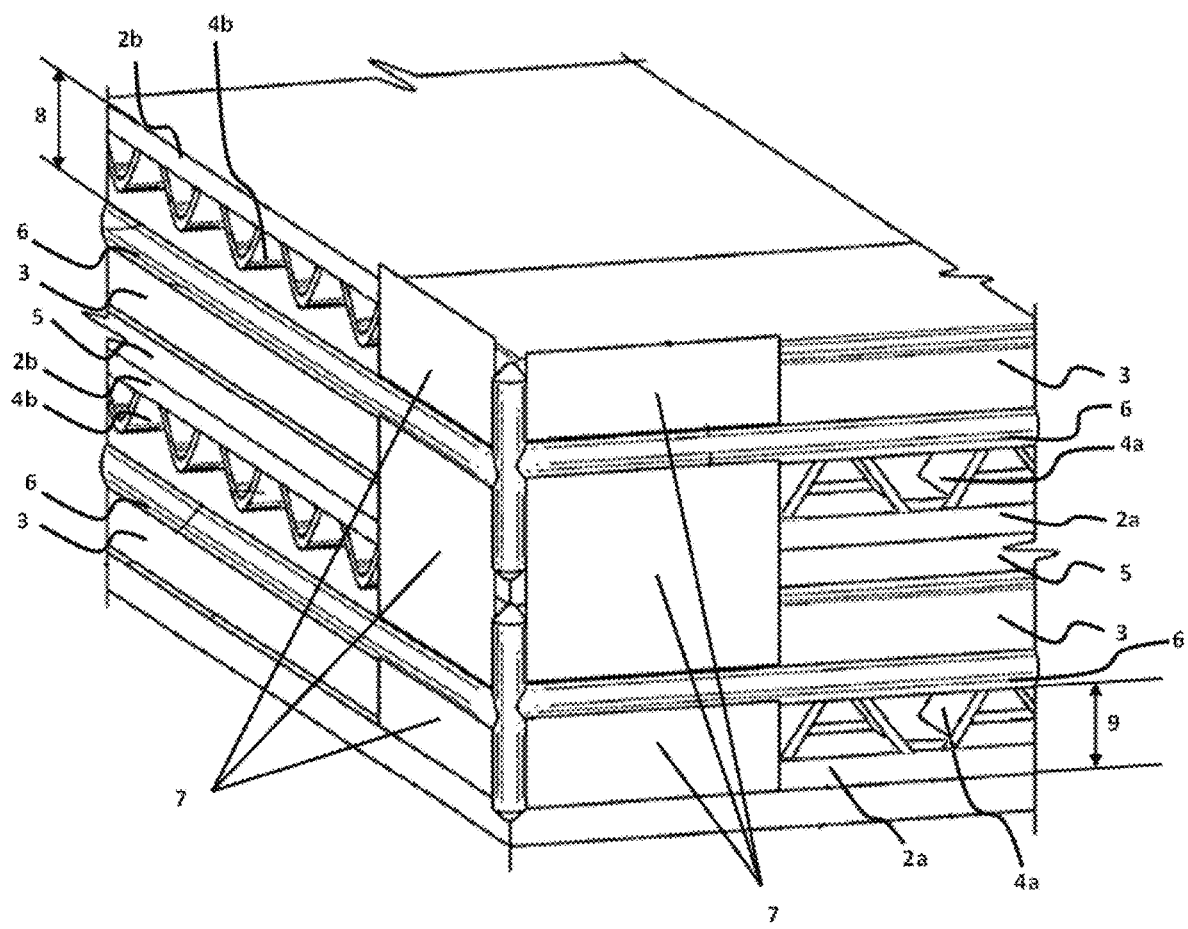
FIG. 4 is a schematic perspective view of the portion of the fuel cell stack shown in FIG. 3, showing the caulk seal as applied to two adjacent sides of the stack.

FIGS. 3 and 4 are schematic perspective views of portions of a corner edge of the fuel cell stack, as in FIGS. 1 and 2, respectively, and show relative and separate placements of the anode and cathode within the fuel cell. In FIG. 3, the individual fuel cell components terminating at adjacent sides of the stack are shown. In particular, on one side, a cathode 2b, corrugated cathode current collector 4b, bipolar separator plate 3, and electrolyte matrix 5 are shown. Portions of the cathode 2b and corrugated cathode current collector 4b are disposed within a top pocket area 8 formed by the bipolar plate 3, so that each component extends to approximately the width of the fuel cell stack. On an adjacent side, an anode 2a, anode current collector 4a, the bipolar plate 3, and electrolyte matrix 5 are shown. The anode 2a and anode current collector 4a are understood to extend into a lower pocket area 9 formed by the bipolar separator plate 3. The pockets formed by the bipolar separator plate 3 are wetted by the molten carbonate electrolyte and thus form wet-seals for the carbonate fuel cells in which the bipolar separator is employed. Also shown on each of the adjacent sides of the illustrative embodiment are the weld beads 6 formed by the bipolar plate 3, which protrude from the edge of the stack face.

FIG. 4 is a schematic perspective view of the portion of the corner edge of the fuel cell stack shown in FIG. 3, after the caulk 7 has been applied to portions of the stack face. As shown in FIG. 4, the caulk 7 is disposed on the portions of the side or edge areas of the faces of the stack formed by the ends of the matrix 5 and the pocket or wet-seal areas formed at the end areas of the bipolar separator plate 3. As shown in FIG. 2, the caulk 7 is applied discontinuously, so that a part of the end area (pocket area) of the bipolar plate 3 remains uncovered. In particular, on each of the stack faces, the caulk is not applied over the weld beads 6 at the pocket areas, so that the surface of each stack face side area with the caulk is smooth. As described above with respect to FIGS. 1 and 2, the discontinuity of the caulk not only accounts for the protruding weld bead in providing a smooth surface on the stack face side or edge areas for sealing with a manifold gasket, but also prevents electrolyte migration from the positive end of the stack to the negative end, because any electrolyte that is absorbed by the caulk 7 cannot vertically migrate farther than the end of the caulk at each weld bead 5 6.

In a fuel cell stack in which the weld bead 6 is less pronounced, or in which no weld bead is present, the caulk 7 may be interrupted at regular intervals along the side area or edge of the stack face, leaving a small portion exposed, to achieve the same result with regard to electrolyte migration. The discontinuity of the caulk, either by not caulking over the weld bead 6 of the bipolar plate, or by interrupting the caulk at regular intervals along the length of the side area or edge of the stack face, has been shown to effectively reduce electrolyte migration by a factor of three.

The caulk composition described herein comprises at least one powder component and at least one binder or rigidizer component. In one embodiment, the powder component is a ceramic fiber including at least one of crushed ceria, zirconia, alumina fibers, or combinations thereof and has a particle size distribution in the range of 95% less than 25 μm and 90% greater than 1 μm. In one embodiment, the bulk fiber is prepared by initially heat treating to temperatures of at least 1500° C. and then ball milling to achieve the desired particle size distribution. In one embodiment, the powder component has a concentration in the range of 50 wt % to 80 wt %. In another embodiment, the powder component has a concentration in the range of 65 wt % to 75 wt %. In one embodiment, the binder or rigidizer component is at least one of ceria or zirconia and is present in an amount of less than 25 wt % of the caulk in a wet state. In one embodiment, the binder or rigidizer component is present in an amount of less than 35 wt % of the caulk in a wet state. In one embodiment, the binder component has a concentration in the range of 20 wt % to 50 wt %. In another embodiment, the binder component has a concentration in the range of 25 wt % to 35 wt %.

In one embodiment, the caulk is formed by combining the powders in the approximate proportions provided above and blended thoroughly. In one embodiment, the bulk fiber is prepared by initially heat treating to temperatures of at least 1500° C. and then ball milling the fiber for 2-3 hours until a particle size distribution in the range of 95% less than 25 μm and 90% greater than 1 μm is attained. In one embodiment, the powder component is a tetragonal and/or cubic phase zirconia material to promote mechanical stability and facilitate proper sintering during heat-treatment. In one embodiment, a binder material is then added in an amount ranging from 20 wt % to 35 wt % to the ball-milled dry powder mixture until a paste is formed and is of sufficient consistency for application to the stack face side or edge area, or when the paste slightly adheres to a spatula held in a vertical position. In one embodiment, the binder is zirconia-based. Once the caulk is applied to the side or edge area of the stack face, it is allowed to dry so that a manifold gasket may be placed against the smooth surface formed by the caulk.

A sample formulation used in one implementation of the caulk includes a zirconia powder present at a concentration of about 69 wt % and a zirconia binder component present at a concentration of about 31 wt %.

Figure 5:
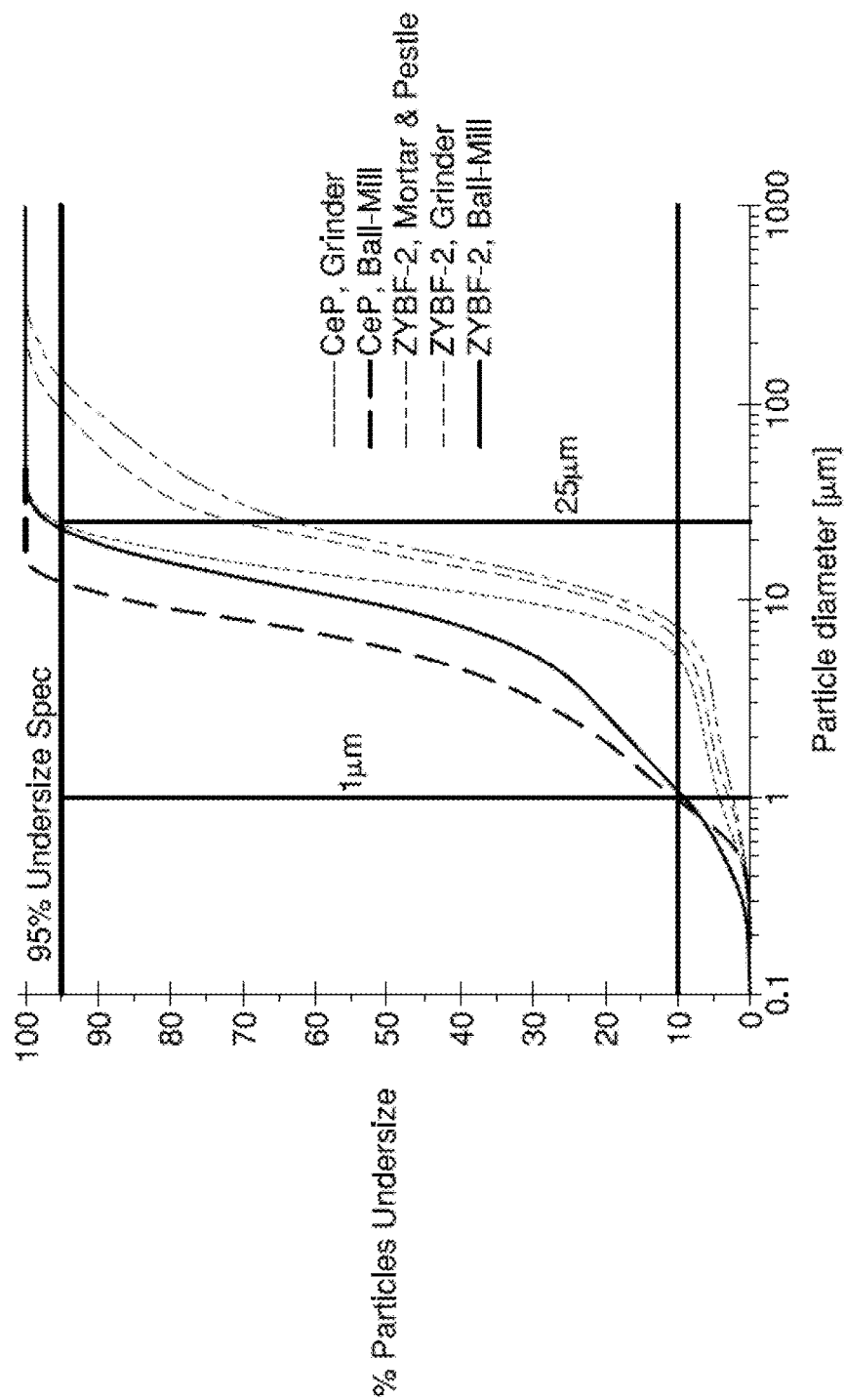
FIG. 5 is a plot of particle size distributions for ceria (CeP) and zirconia (ZYBF-2) powders from after grinding fibers by various techniques.

The dried caulk paste, as noted above, reduces electrolyte absorption and which, in addition to limiting vertical electrolyte migration, also reduces the horizontal electrolyte migration that has been described above as another problem with electrolyte management in the art. Several critical factors contribute to the caulk being able to resist carbonate electrolyte absorption. For example, it was determined that pre-treatment of the bulk fiber (i.e. the powder component) to a heating step at temperatures exceeding approximately 1500° C. prior to mixing with the binder component enabled the fiber to more effectively resist carbonate electrolyte migration. Additionally, it was also determined that the quantity of binder component used to achieve the desired consistency of the caulk also contributed to the caulk's ability to resist carbonate electrolyte migration—higher binder quantities in the caulk formulation results in higher carbonate electrolyte absorption during operation. For example, caulk formulations composed of greater than about 35 wt % binder component were shown to absorb a significant amount of carbonate electrolyte. Thus, because the amount of required binder may be determined by the particle size of the powderized bulk fiber, to achieve minimal carbonate electrolyte absorption, the bulk fiber should be maintained with particle size diameters in the range of about 1 μm and about 25 μm and at a tight particle size distribution in the range of 95% less than 25 μm and 90% greater than 1 μm. FIG. 5 shows a particle size distribution graph for different grinding techniques. As is seen from FIG. 5, ball-milling was the most effective method in achieving the tightest particle size distributions for ceria (90% greater than approximately 1 μm and 95% less than approximately 15 μm) and zirconia (90% greater than approximately 1 μm and 95% less than approximately 20 μm). It is contemplated that other milling methods may achieve similar results after optimization of process conditions.

Comparative Example

Three formulations of the caulk compositions were comparted to test for caulk carbonate electrolyte absorption resistance and mechanical stability. Listed in Table 1 below are formulations for the three tested samples.

TABLE 1

| Caulk formulation and electrolyte absorption | | | |
| --- | --- | --- | --- |
| Formulation | Sample 1 | Sample 2 | Sample 3 |
| Wt % zirconia powder | 20 | — | 69 |
| Wt % ceria powder | 29 | 68 | — |
| Wt % zirconia binder | 51 | — | 31 |
| Wt % ceria binder | — | 32 | — |
| Wt % carbonate electrolyte absorption, 500 hrs at 650° C. | 10.8 | 5.1 | 7.0 |

Figure 7:
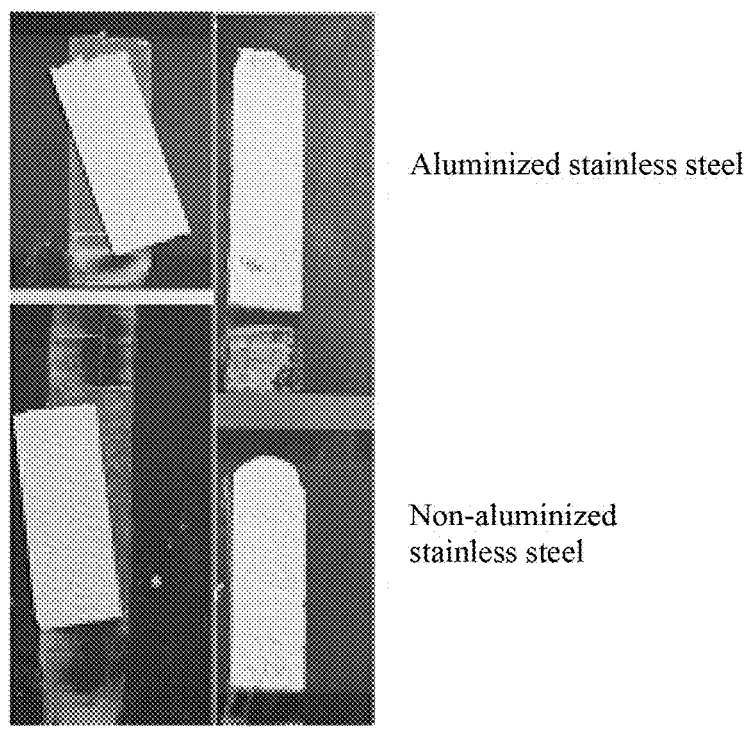
FIG. 7 shows images of adhesion testing results comparing samples 2 and 3 on stainless steel components of the stack face.

Sample 1, which employed ceria (29 wt %) and zirconia (20 wt %) bulk fibers and a zirconia binder (51 wt %), exhibited the highest levels of carbonate electrolyte absorption at 10.8% due to the largest particle size diameters. As explained above, higher binder quantities in the caulk formulation results in higher carbonate electrolyte absorption during operation. In sample 1, a binder quantity of greater than 50% was required to achieve a consistency of the caulk paste necessary for application onto the side or edge area of the stack face. Sample 2, which employed heat-treated (at greater than 1500° C.) ceria bulk fiber (68 wt %, 95% less than 25 μm) and a ceria binder (32 wt %) and exhibited the lowest levels of carbonate electrolyte absorption at 5.1%, nevertheless experienced cracking and poor adhesion to the stack face due to the ceria-based binder (see FIG. 7). Furthermore, the use of ceria in sample 2 also increased costs relative to sample 3. Sample 3, which employed heat-treated (at greater than 1500° C.) zirconia bulk fiber (69 wt %, 95% less than 25 μm and 90% greater than 1 μm) and a zirconia binder (31 wt %), recorded a carbonate electrolyte absorption at 7.0%, adhered well to the metal and ceramic components of the stack face, and maintained its structural integrity at high-temperatures. Thus, sample 3 exhibits the best combination of low carbonate electrolyte absorption and mechanical stability (i.e. adhesion to the stack face, see FIG. 7) with the added benefit of being the least expensive of all three samples since it does not incorporate ceria.

Figure 6:
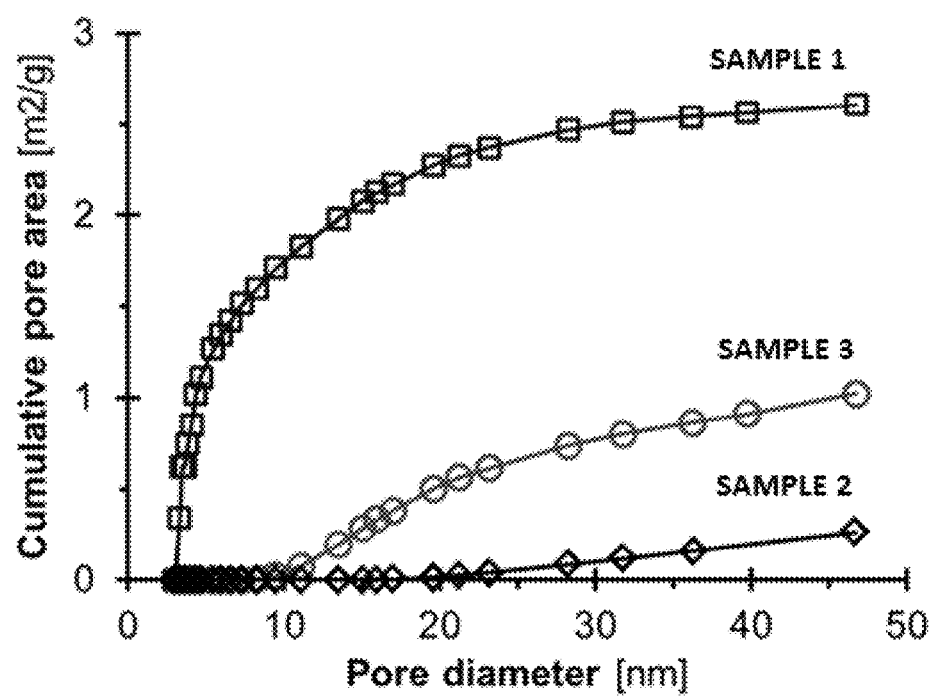
FIG. 6 is a plot of cumulative pore area as a function of pore diameter for samples 1-3.

FIG. 6 shows the micropore area distributions of samples 1-3 after application to the stack face. Micropore areas are a critical physical characteristic of the caulk because it is indicative of electrolyte absorption—higher pore area may cause higher electrolyte absorption. Moreover, pore size distribution is a function of the materials used to form the caulk, which must be compatible with the electrolyte and with the carbonate fuel cells. As is seen in FIG. 6, samples 2 and 3 demonstrate far lower micropore areas than sample 1. These results correlate well with the carbonate electrolyte absorption data of Table 1 above, which shows samples 1, 2, and 3 having wt % carbonate electrolyte absorptions of 10.8, 5.1, and 7.0, respectively.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the caulk composition as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A caulk composition comprising:
   at least one powder component, wherein:
      the powder component is a ball-milled powder component comprising ceria, zirconia, alumina, or a combination thereof, the powder component is a heat-treated powder component that has been heated to a temperature of at least 1500° C.,
the powder component is present in a concentration range of 65 wt % to 75 wt % of the caulk composition, and
the powder component has a particle size distribution of 95% less than 25 μm and 90% greater than 1 μm; and
at least one binder component, wherein the binder component is present in a concentration range of 25 wt % to 35 wt % of the caulk composition.

2. The caulk composition of claim 1, wherein the powder component is zirconia.

3. The caulk composition of claim 1, wherein the binder component comprises at least one of ceria or zirconia.

4. The caulk composition of claim 3, wherein the binder component is zirconia.

5. The caulk composition of claim 1, further comprising pores having a pore diameter in a range of about 1 nm to about 50 nm.

6. The caulk composition of claim 1, further comprising pores having a cumulative pore area of at most about 1 m²/g.

7. The caulk composition of claim 1, wherein the at least one powder component and the at least one binder component do not include ceria.

8. A molten carbonate fuel cell (MCFC) comprising:
a fuel cell stack;
a manifold; and
a caulk between the fuel cell stack and the manifold, the caulk comprising:
at least one powder component, wherein:
the powder component is a ball-milled powder component comprising ceria, zirconia, alumina, or a combination thereof,
the powder component is a heat-treated powder component that has been heated at a temperature of to least 1500° C.,
the powder component is present in a concentration range of 65 wt % to 75 wt % of the caulk composition, and
the powder component has a particle size distribution of 95% less than 25 μm and 90% greater than 1 μm; and
at least one binder component, wherein the binder component is present in a concentration range of 25 wt % to 35 wt % of the caulk composition.

9. The MCFC of claim 8, wherein the fuel cell stack comprises a plurality of fuel cells, with each fuel cell including a cathode, an anode, an electrically conductive separator plate, corrugated current collectors, and an electrolyte matrix.

10. The MCFC of claim 9, wherein the caulk is positioned on a first portion of each fuel cell formed by the electrolyte matrix and on a second portion of each fuel cell formed by the separator plate.

11. The MCFC of claim 10, wherein the separator plate comprises a weld bead positioned between a top trough and a bottom trough of the separator plate and wherein the weld bead remains uncovered from the caulk to form a discontinuity.

12. The MCFC of claim 8, wherein the caulk is positioned discontinuously over the fuel cell stack.

13. The MCFC of claim 8, wherein the MCFC is configured to minimize electrolyte migration from a positive end of the fuel cell stack to a negative end of the fuel cell stack.

14. The caulk composition of claim 1, wherein the powder component is at least one of tetragonal phase zirconia or cubic phase zirconia.

15. The MCFC of claim 8, wherein the powder component is zirconia.

16. The MCFC of claim 8, wherein the binder component comprises at least one of ceria or zirconia.

17. The MCFC of claim 8, wherein the binder component is zirconia.

18. The MCFC of claim 8, wherein the caulk comprises pores having a pore diameter in a range of about 1 nm to about 50 nm.

19. The MCFC of claim 8, wherein the caulk comprises pores having a cumulative pore area of at most about 1 m²/g.

20. The MCFC of claim 8, wherein the at least one powder component and the at least one binder component do not include ceria.

* * * * *